Figure 1:
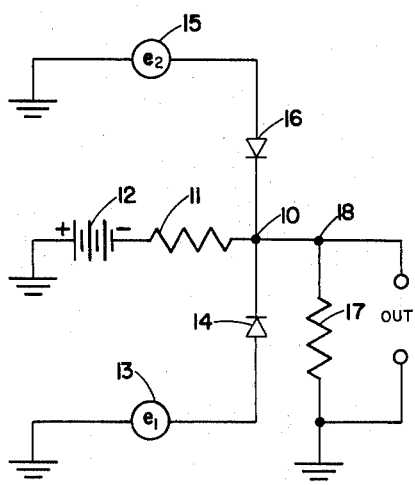

Aug. 31, 1965     D. J. ROTIER     3,204,118

VOLTAGE CONTROL APPARATUS

Filed Oct. 17, 1961     2 Sheets-Sheet 1

*INVENTOR.*
DONALD J. ROTIER

BY *George N. Field*

ATTORNEY.

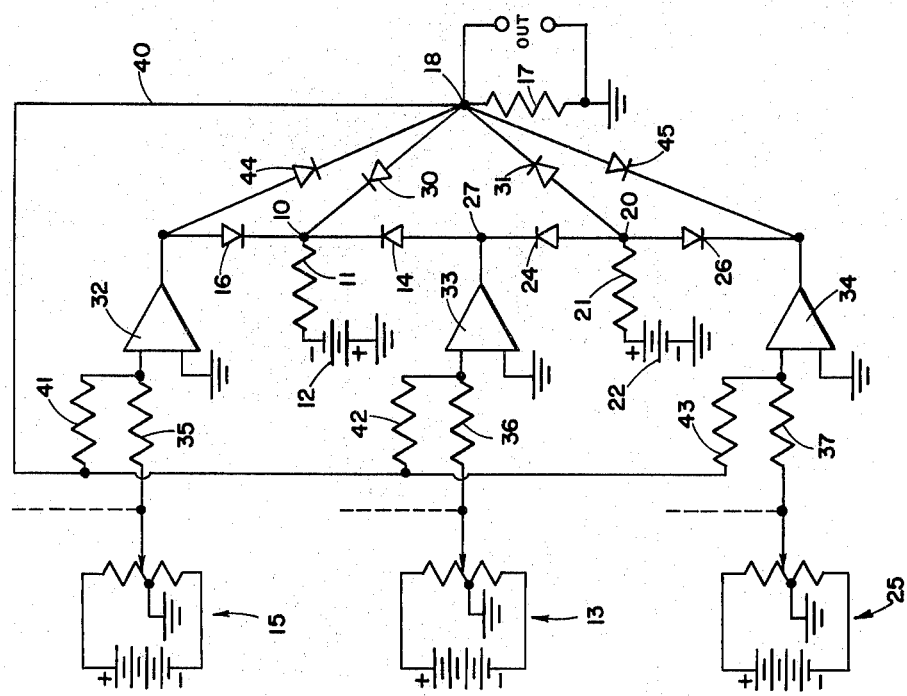

United States Patent Office 3,204,118
Patented Aug. 31, 1965

3,204,118
VOLTAGE CONTROL APPARATUS
Donald J. Rotier, Crystal, Minn., assignor to Honeywell Inc., a corporation of Delaware
Filed Oct. 17, 1961, Ser. No. 145,643
7 Claims. (Cl. 307—88.5)

This invention relates generally to the field of electrical circuitry, and specifically to an adjustable diode limiting circuit in which inaccuracies in the limiting due to the fact that practical diodes do not have zero forward impedance are minimized, and in which the limiting voltages are not constrained to a single polarity.

It is the object of the invention to provide an improved adjustable limiter circuit, as explained more fully in the accompanying descriptive matter and as illustrated in the subjoined drawing, both of which form a further part hereof.

In the drawing, FIGURES 1 to 4 illustrate principles involved in the invention and FIGURE 5 shows a preferred embodiment of the invention.

In FIGURE 1 there is shown a summation point 10 connected to ground through a resistor 11 and battery 12 having its positive terminal grounded. A first source of voltage 13 has one terminal connected to ground and the other connected to point 10 through a diode 14, and a second source of voltage 15 has one terminal connected to ground and the other connected to point 10 through a diode 16. A load resistor 17 is connected between ground and point 10. Diodes 14 and 16 are connected so that their directions of good conductivity are both toward point 10. It is well known that as long as neither source 13 nor source 15 is more negative than battery 12, the output terminal 18 connected to point 10 is maintained at a potential relative to ground equal to the least negative of the voltages supplied by sources 13 and 15, if the forward voltage drops in the diodes may be neglected. Thus if the voltage of source 15 is fixed and that of source 13 varies, the output voltage varies with that of source 13 until the latter reaches a value equal to that of source 15: thereafter the output voltage remains constant regardless of any further negative increase in the voltage of source 13.

Figure 2:
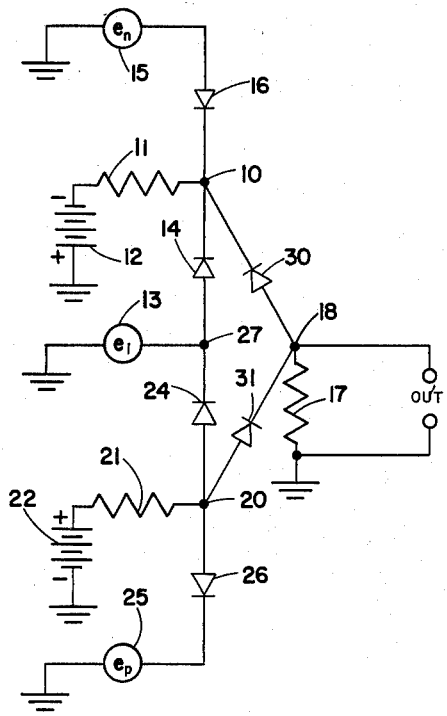

If the polarity of the battery and the directions of the diodes are reversed, the output terminal 18 is maintained at the least positive of the voltages supplied by the two sources. FIGURE 2 shows how advantage may be taken of this to limit excursions of a signal voltage in both directions. In this figure, elements 10 to 17 are the same as in FIGURE 1. A further summation point 20 is connected to ground through a resistor 21 and a battery 22 having its negative terminal grounded. A pair of diodes 24 and 26 are connected to point 20 so that their directions of good conduction are both away from point 20. Diode 24 is connected at junction point 27 to source 13, and diode 26 is connected to one terminal of a further source 25 having its other terminal grounded. The outputs at summation points 10 and 20 are both desired at output terminal 18: since direct connection would short out diodes 14 and 24 in series, points 10 and 20 are connected to output terminal 18 through a pair of further diodes 30 and 31, the former having its direction of good conductivity toward summation point 10 and the latter having its direction of good conductivity away from summation point 20. Battery 22 is more positive than the greatest expected positive value for source 13 or source 25.

As long as source 13 is less negative than source 15, and less positive than source 25, summation points 10, 20, and 27, and output terminal 18 are substantially at the same potential. If source 13 becomes more negative than source 15, the voltage at point 20 can follow it, but is cut off from the output by diode 31. The voltage on point 10 remains at that of source 15, and is transmitted to output terminal 18 through diode 30. Similarly if source 13 becomes more positive than source 25, the voltage at point 10 can follow it but is cut off from output terminal 18 by diode 30. The voltage on point 20 remains that of source 25 and is transmitted through diode 31.

The following table gives illustrative values of output voltage at point 18 for various input voltages: it assumes that batteries 12 and 22 supply 18 volts each and that sources 15 and 25 are 10 volts negative and positive respectively.

*Table of representative voltages*

| Source 13 | Source 15 | Source 25 | Point 10 | Point 20 | Output 18 |
|---|---|---|---|---|---|
| −15 | −10 | +10 | −10 | −15 | −10 |
| −10 | −10 | +10 | −10 | −10 | −10 |
| −5 | −10 | +10 | −5 | −5 | −5 |
| 0 | −10 | +10 | 0 | 0 | 0 |
| +5 | −10 | +10 | +5 | +5 | +5 |
| +10 | −10 | +10 | +10 | +10 | +10 |
| +15 | −10 | +10 | +15 | +10 | +10 |

Figure 3:
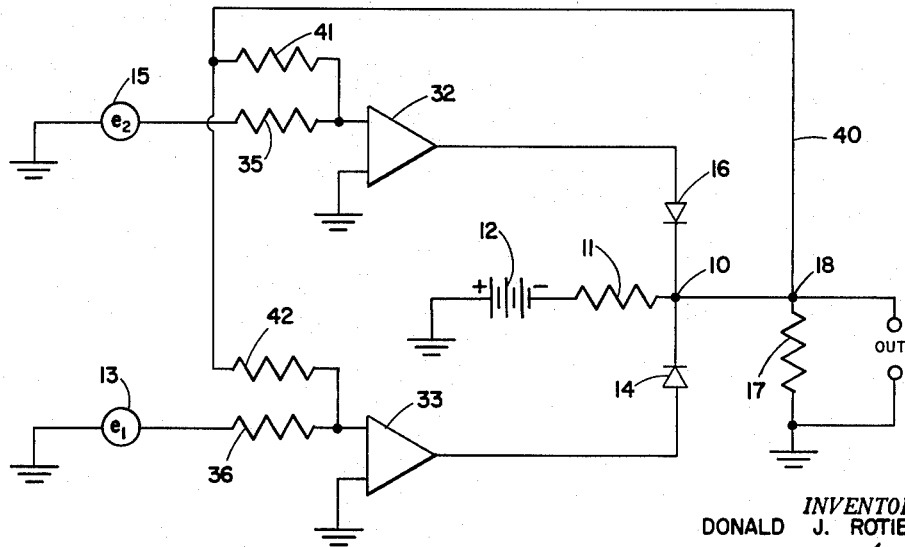

For obvious reasons it is desirable that source 13 include an amplifier so that increased system sensitivity may be obtained. Also it is frequently desirable that sources 15 and 25 be condition responsive instead of merely hand settable, and here again the use of amplifiers increases system sensitivity. When amplifiers are used, it is possible to compensate for the deviations of the forward resistances of practical diodes from the ideal zero value, as is shown in FIGURE 3. Here a high gain amplifier 32 is inserted between source 13 and diode 14, and a second high gain amplifier 33 is inserted between source 15 and diode 16. The inputs to the amplifiers are supplied through summing resistors 35 and 36. The compensation referred to above is accomplished by a feedback connection 40 from the output to both amplifier inputs, through summing resistors 41 and 42. It will be apparent that when diode 14 is conducting, diode 16 is not conducting: the output voltage is determined by source 13 and is independent of source 15. Amplifier 32 thus is effectively operating in open loop mode while diode 14 closes the feedback loop around amplifier 33 as well as providing the output signal. The closed loop operation minimizes nonlinearities inside the loop, including the effect of forward resistance in the diode. Meanwhile amplifier 32 is acting as an error detector comparing the feedback voltage with the signal from source 15, as weighted by resistors 35 and 41.

When diode 16 conducts, diode 14 is not conducting: the output voltage is determined by source 15 and is independent of source 13. Amplifier 33 is thus effectively operating in open loop mode while diode 16 closes the feedback loop around amplifier 32 as well as providing the output signal: amplifier 33 is now acting as an error detector. It is convenient to so proportion the negative feedback in the circuit that, although amplifiers 32 and 33 individually have very high gain, each acts in the closed loop mode as though it had a gain of 1.

Referring again to FIGURE 2, it is a condition for satisfactory operation that the signal from source 15 must at all times be more negative than that from source 25. The signal from source 13 is not thus restricted, although all three must be smaller numerically than the standard voltages supplied by batteries 12 and 22. A special condition can arise which is illustrated by the case where source 15 is +5 volts, source 25 is +15 volts, and source 13 is −15 volts. In this case, the potential at summation point 10 is +5 volts and that at summation point 20 is −15 volts. Note that under these conditions neither summation point voltage can be transmitted to output terminal 18 since diodes 30 and 31 are reversely connected and hence act as open circuits. This can be corrected, as shown in FIGURE 4, by the addition of a further diode 44 connected between source 15 and the output terminal so that its direction of good conduction is away from the source. The relation of diode 44 to diode 16 may be considered as a back-to-back connection. By definition, a back-to-back connection in this specification includes anode to anode as well as cathode to cathode. Since source 15 is at this time determining the voltage at summation point 10, addition of diode 44 accomplishes the result which is ordinarily accomplished by diode 30. A similar diode 45 may be supplied in a back-to-back connection to diode 26 to take care of the opposite special condition illustrated by the case where source 15 is −15 volts, source 25 is −5 volts, and source 13 is +15 volts. Note that for the first illustrative case diode 45 is so connected in the circuit as not to conduct, while in the second illustrative case diode 44 is so connected as not to conduct, and that neither conducts where the outputs of sources 15 and 25 have their normal polarities.

A preferred embodiment of the invention is shown in FIGURE 5 where the same reference numerals are used as before. Each of sources 13, 15, and 25 is shown to comprise a battery connected to the winding of a voltage divider having a grounded center tap and a movable contact operated by a suitable mechanical connection. The movable contact of source 13 is arranged for operation in accordance with a condition of interest, and a suitable indicating or control device is connected between output terminal 18 and ground. If simple limiting to fixed limits is desired, sources 15 and 25 may be arranged with control knobs for manual setting. If scheduled control of limit values is desired, sources 15 and 25 may also be arranged for condition responsive operation: the conditions in question must be so related that source 25 can never become more positive than source 15, when amplifiers 32, 33, and 34 are of the usual phase reversing nature.

Numerous objects and advantages of my invention have been set forth in the foregoing description together with details of the structure and function of the invention, and the novel features thereof are pointed out in the appended claims. The disclosure, however, is illustrative only, and I may make changes in detail within the principle of the invention to the full extent indicated by the broad general meaning of the terms in which the appended claims are expressed.

I claim as my invention:

1. In combination: an output device for supplying an electrical signal which must not exceed a range of values extending betwen a least negative value and a least positive value; means supplying a first input signal which may vary through a wider range of values; and means supplying first and second control means which are always less negative and less positive respectively than the most negative and most positive possible values of said input signal; first and second biased diode circuits; means connecting said circuits to receive said input signal and said control signals, so that said first diode circuit gives an output determined by the least positive of said input signal and said first control signal, while said second diode circuit gives an output determined by the least negative of said input signal and said second control signal, and means connecting said diode circuits to said output device.

2. In combination: a first plurality of diodes connected to a first common point so that their directions of good conductivity are all toward the point; a second plurality of diodes connected to a second common point so that their directions of good conductivity are all away from the point; means connected to said first and second common points for biasing said first and second points negatively and positively respectively; means connecting first diodes of each of said pluralities together to define a first input point; means connecting second diodes of each of said pluralities together to define an output point; further diode means connected in back-to-back relation to third diodes of each plurality at second and third input points respectively; means connecting said further diode means to said output point; input means including first, second, and third amplifiers connecting to said input points respectively; and feedback means connecting said output point to all said amplifiers.

3. In combination: a first plurality of diodes connected to a first common point so that their directions of good conductivity are all toward the point; a second plurality of diodes connected to a second common point so that their directions of good conductivity are all away from the point; means connected to said first and second common points for biasing said first and second points negatively and positively respectively; means connecting first diodes of each of said pluralities together to define a first input point; means connecting second diodes of each of said pluralities together to define an output point; further diode means connected in back-to-back relation to third diodes of each plurality at second and third input points respectively; means connecting said further diode means to said output point; and input means connected to said input points.

4. In combination: a first plurality of diodes connected to a first common point so that their directions of good conductivity are all toward the point; a second plurality of diodes connected to a second common point so that their directions of good conductivity are all away from the point; means connected to said first and second common points for biasing said first and second points negatively and positively respectively; means connecting first diodes of each of said pluralities together to define a first input point; means connecting said second diodes of each of said pluralities together to define an output point; input means including first, second, and third amplifiers connected to said input point and to third diodes of each plurality respectively; and feedback means connecting said output point to all said amplifiers.

5. A limiter comprising a plurality of diodes connected to a common point so that their directions of good conductivity are all the same relative to said point; biasing means connected to said point so as to favor conduction through said diodes; means connected to a first of said diodes for supplying a control voltage thereto; means supplying to a second of said diodes a variable input signal voltage which may exceed said control voltage; and output means connected to said common point so that the signal to said output means varies with said input signal voltage until the latter becomes equal to said control voltage, and thereafter remains equal to said control voltage, and thereafter remains equal to said control voltage regardless of further increase in said input signal voltage.

6. In combination:
first means for conducting only the least positive of first and second signals applied thereto;
second means for conducting only the least negative of first and second signals applied thereto;
output means connected to both said first means and said second means;
means independently supplying positive and negative comparison signals as the first signals to said first and second means respectively; and
means supplying a further signal as the second signal to each of said first and second means, so that said output means is energized with a signal which varies with said further signal until the latter reaches the magnitude of one of said comparison signals and thereafter remains constant regardless of increase in said further signal.

7. In combination:
means supplying first and second unidirectional signals relative to a reference potential;

means supplying a further electrical signal of a selected polarity and of greater magnitude than either of said first and second signals; and means including a pair of diodes for connecting all said signals to a summing point on such a manner that the potential of said summing point is continuously representative, in magnitude and polarity, of that one of said first and second signals which is of least magnitude in said selected polarities.

References Cited by the Examiner

UNITED STATES PATENTS

| | | | |
|---|---|---|---|
| 2,557,729 | 6/51 | Eckert | 307—88.5 |
| 2,712,065 | 6/55 | Elbourn et al. | 307—88.5 |
| 2,783,453 | 2/57 | Rose | 340—149 |
| 2,867,723 | 1/59 | Spaulding | 328—209 |
| 3,021,514 | 2/62 | Regis. | |
| 3,048,712 | 8/62 | Alm | 307—88.5 |
| 3,096,446 | 7/63 | Cohen | 307—88.5 |
| 3,130,325 | 4/64 | Rubin et al. | 328—209 |

OTHER REFERENCES

"Electronic Analog Computers," by Korn and Korn, published by McGraw-Hill Book Co., New York, 1956, 2nd edition, pages 282 and 283.

ARTHUR GAUSS, *Primary Examiner.*

GEORGE N. WESTBY, *Examiner.*